No. 746,043. PATENTED DEC. 8, 1903.
E. DENEGRE.
SPRING DAMPENER.
APPLICATION FILED JAN. 2, 1903.
NO MODEL. 2 SHEETS—SHEET 1.

Witnesses:
F. C. Barry.
J. C. Lee.

Inventor:
Edward Denegre.
by A. Miller Belfield
Attorney.

THE NORRIS PETERS CO., PHOTO-LITHO., WASHINGTON, D. C.

No. 746,043. PATENTED DEC. 8, 1903.
E. DENEGRE.
SPRING DAMPENER.
APPLICATION FILED JAN. 2, 1903.

NO MODEL. 2 SHEETS—SHEET 2.

Witnesses:
H. E. Batty.
J. C. Lee

Inventor:
Edward Denegre,
by A. Miller Duffield
Attorney.

No. 746,043.

Patented December 8, 1903.

UNITED STATES PATENT OFFICE.

EDWARD DENEGRE, OF CHICAGO, ILLINOIS, ASSIGNOR TO McCORD & COMPANY, OF CHICAGO, ILLINOIS, A CORPORATION OF NEW JERSEY.

SPRING-DAMPENER.

SPECIFICATION forming part of Letters Patent No. 746,043, dated December 8, 1903.

Application filed January 2, 1903. Serial No. 137,547. (No model.)

*To all whom it may concern:*

Be it known that I, EDWARD DENEGRE, a citizen of the United States, residing at Chicago, in the county of Cook and State of Illinois, have invented a certain new and useful Improvement in Spring-Dampeners, of which the following is a full, clear, concise, and exact description, reference being had to the accompanying drawings, forming a part of this specification.

My invention relates to spring-dampeners for use upon railway-cars and the like to dampen or suppress the vibratory movements of the springs thereof.

Prominent objects of the invention are to provide a simple, practical, and durable form of spring-dampener, to increase the dampening action and secure a high degree of efficiency and effectiveness, and to secure the above results in a simple and expeditious manner.

In the spring-dampener which I have herein shown for carrying out my invention I provide a flat or leaf spring member which opposes the load just as the coil spring or springs do. A simple arrangement is to make this flat spring member in the form of a two-part casing, one part above and the other below the coil-spring member, and to construct the two parts with inclined spring sides whereof those of one part oppose those of the other. By such arrangement the load is opposed by the spring-casing and the coil-springs are dampened thereby. According to my invention also I combine with such a flat spring member a friction device which increases the dampening action. A simple arrangement is to provide a friction device which is interposed between the opposing spring sides of the two parts of the casing, so that as the same are forced together and move outwardly they slide upon the friction device, which is held stationary, and thereby add friction, which assists in repressing vibration.

Figure 1:
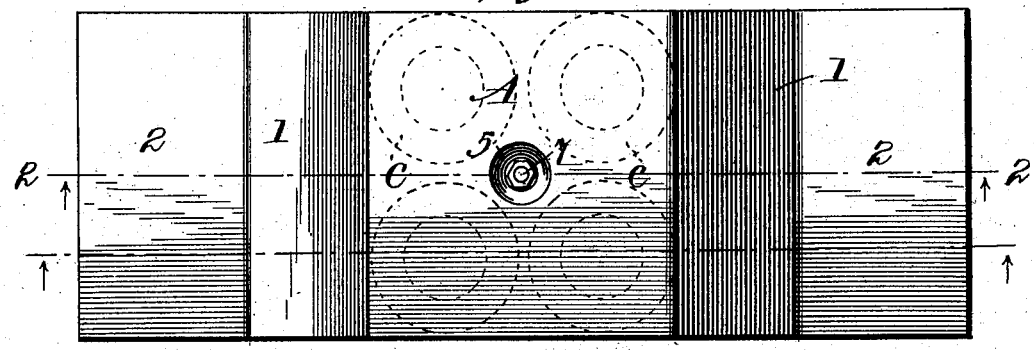
Figure 2:
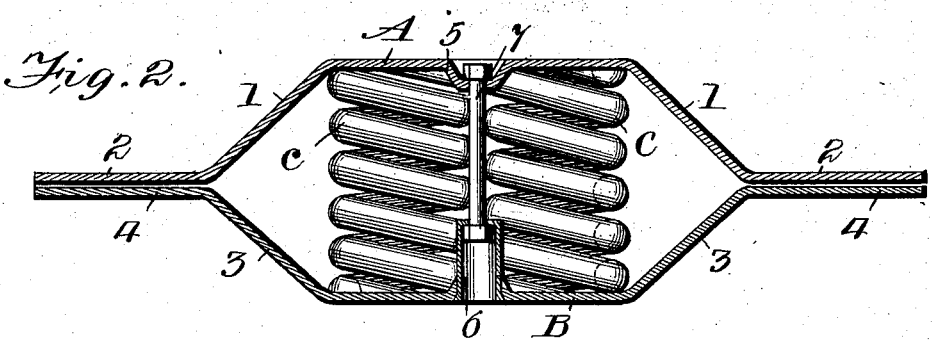
Figure 3:
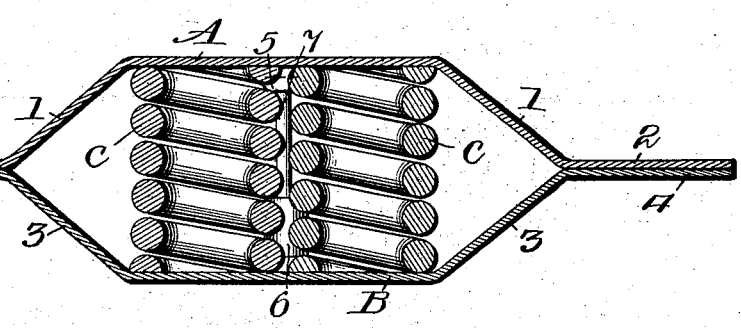
Figure 4:
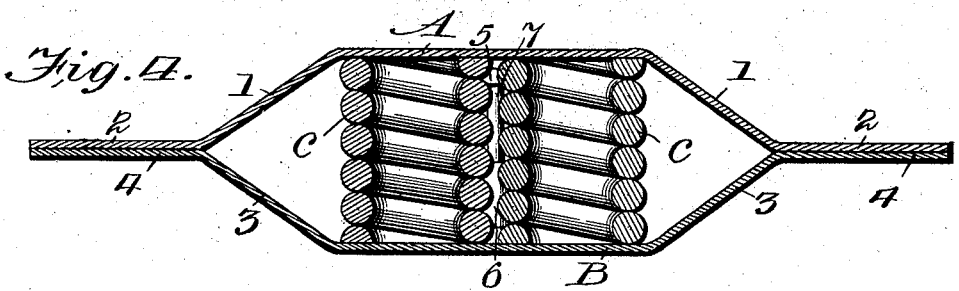
Figure 5:
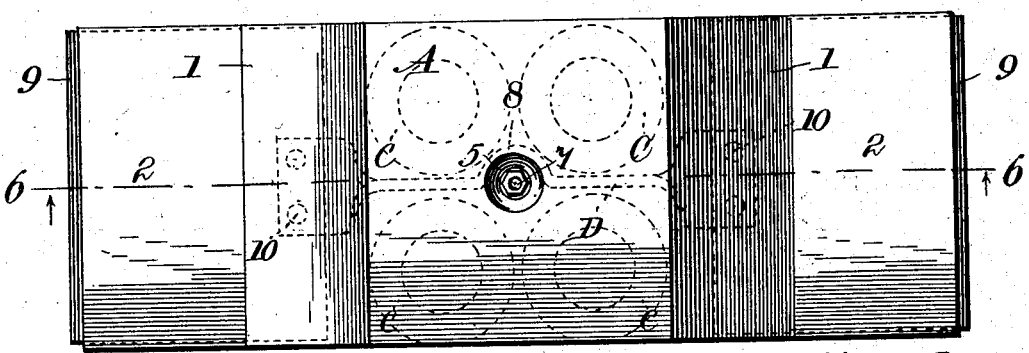
Figure 6:
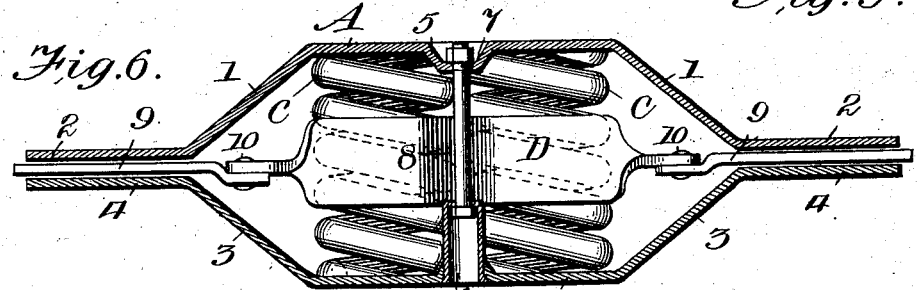
Figure 7:
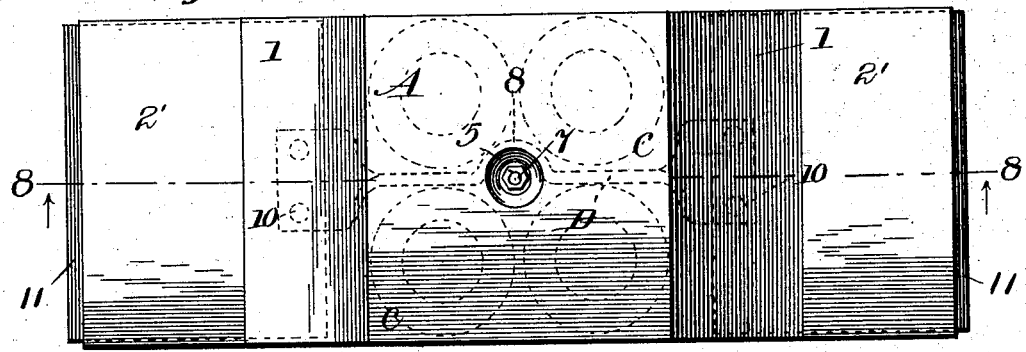

In the accompanying drawings, Figure 1 is a plan of a spring-dampener embodying my present invention. Fig. 2 is a vertical section taken on line 2 2 in Fig. 1, it being understood that in this figure the device is not subject to any load. Fig. 3 is a section similar to that of Fig. 2 with the dampener subject to partial load. Fig. 4 is a similar section with the device subject to full load. Fig. 5 is a plan of a modified form of dampener. Fig. 6 is a vertical section taken on line 6 6 in Fig. 5. Fig. 7 is a plan of a still different modification; and Fig. 8 is a section of the same, taken on line 8 8 in Fig. 7.

Referring first to Figs. 1 to 4, inclusive, the device shown in these figures consists of an upper metallic plate A and a lower metal plate B, the two being arranged opposite one another, with a set of coil-springs C C interposed between them. The plates A and B are desirably made of spring metal, such as spring-steel. The plate A is constructed with sloping or oblique sides 1 1, having flat end or tail pieces 2 2, and the plate B is desirably constructed with similar sides 3 3, having flat tailpieces 4 4, which latter are arranged opposite the tailpieces 2 2. The plate A is provided with a socket 5 and the plate B with a socket 6 and a bolt 7 is extended through these plates, so that its head fits in the socket 6, and its nut in the socket 5. When the device as thus constructed is not subject to any load, it will be in the position shown in Fig. 2. When it is subject to partial load, however, the plates A and B will be forced toward each other, with the result that the sides 1 1 and 3 3 thereof will become flattened out to some extent. When subject to a still greater load, as shown in Fig. 4, these oblique sides will be flattened out still more. Thus it will be seen that the oblique sides of the casing formed by the plates A and B offer a resistance to the spring action which serves to dampen or suppress the vibratory movement of the coil-springs C C.

In Figs. 5 and 6 I have shown a device having a generally similar construction to that of Figs. 1 to 4. It consists of upper and lower spring-plates A and B, having oblique sides 1 1 and 3 3, with flat ends 2 2 and 4 4, respectively. These plates are held together by a bolt 7. In this device, however, the flat ends 2 2 and 4 4 of the plates A and B do not quite meet under any load, but are separated by an appreciable space, as well shown in Fig. 6. Within the casing formed by these two plates is a yoke D, which extends lengthwise of the device and is made with a bent portion 8, which is arranged at one side of the bolt 7. Friction members in the form of plates 9 9 are attached to the opposite ends of the yoke D, as by rivets 10 10. These plates 9 9 are of sufficient width to extend substantially across the width of the flat ends 2 2 and 4 4 of the casing-plates A and B. In this device the action of the load, as before, compresses the coil-springs C C, thereby bringing the plates A and B toward one another and causing the spring sides 1 1 and 3 3 thereof to assume a greater obliquity. In the present device, however, the flat ends 2 2 and 4 4 of these plates A and B both rub against the friction-plates 9 9 in their movements, so that friction is produced between the flat ends 2 2 and 4 4 and the friction-plates 9 9, which adds to the dampening or vibration-suppressing effect. In the device of Figs. 1 to 4, inclusive, it will be observed that the flat ends 2 2 and 4 4 of the plates A and B move substantially in unison, and consequently there is no rubbing or surface friction between them.

Figure 8:
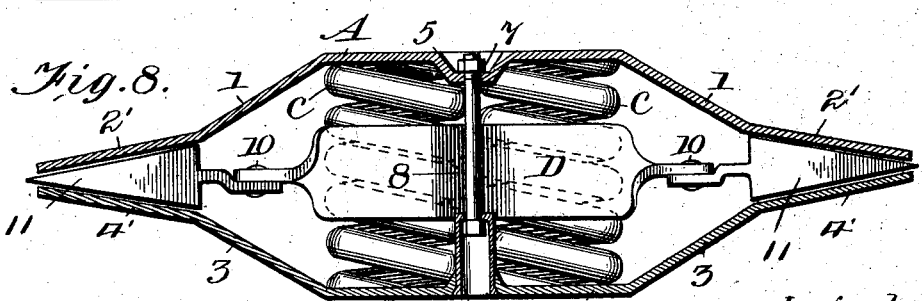

The device shown in Figs. 7 and 8 is similar to that shown in Figs. 5 and 6, except that the end portions 2' 2' and 4' 4' are inclined to one another instead of being parallel and the friction elements between them are in the form of wedges 11 11. By this arrangement the friction on compression of the coil-springs is reduced, but is increased on expansion of those springs. Thus the dampening action is modified or regulated to conform more closely to the desired requirements.

I claim—

1. In a spring-dampener, a spring-plate having outwardly-inclined spring sides provided with outwardly-bent end portions, substantially as described.

2. A spring-dampener, consisting of a coil spring or springs, and a spring-casing consisting of two spring plates or members having outwardly-extending inclined spring sides provided with opposing outwardly-extending end portions, substantially as described.

3. In a spring-dampener, the combination with a coil spring or springs, of a flat spring member and a friction device acting to produce a dampening effect, substantially as described.

4. In a spring-dampener, the combination with a coil spring or springs, of a flat spring member, and a friction device coöperating with said member to produce a dampening effect, substantially as described.

5. In a spring-dampener, the combination with opposing spring members, of a friction device interposed between said members, substantially as described.

6. In a spring-dampener, the combination of a two-part spring-casing having opposing spring surfaces and a friction device interposed between said surfaces, substantially as described.

7. In a spring-dampener, the combination with a two-part spring-casing, whereof the two parts have similarly-extending converging spring sides provided with abutting bent end portions, and a friction device consisting of friction members interposed between said abutting end portions, and a connection between said friction members, substantially as described.

8. A spring-dampener, comprising a coil spring or springs, a two-part casing whereof the parts are arranged at the opposite ends of the coil-springs and are constructed with outwardly-extending converging spring sides having outwardly-bent opposing end portions, and a friction device consisting of friction elements, interposed between the opposing end portions of the sides, and a connecting-bar between said friction elements, substantially as described.

9. A spring-dampener, comprising a coil spring or springs, a two-part casing whereof the parts are arranged at the opposite ends of the coil-springs and are constructed with outwardly-extending inclined spring sides having outwardly-bent opposing end portions, and a friction device consisting of wedge-shaped friction elements interposed between the opposing end portions of the sides, and a connecting-bar between said friction elements, substantially as described.

In witness whereof I hereunto subscribe my name this 30th day of December, A. D. 1902.

EDWARD DENEGRE.

Witnesses:
A. MILLER BELFIELD,
I. C. LEE.